United States Patent [19]

Matsubara

[11] Patent Number: 4,900,570
[45] Date of Patent: Feb. 13, 1990

[54] SHRIMP FORMING PROCESS

[75] Inventor: Hiro Matsubara, Monterey Park, Calif.

[73] Assignee: JAC Creative Foods, Inc., Los Angeles, Calif.

[21] Appl. No.: 208,592

[22] Filed: Jun. 20, 1988

[51] Int. Cl.$^4$ .......................... A23L 1/27; A23L 1/325; A23P 1/00

[52] U.S. Cl. .................................. 426/250; 425/542; 426/513; 426/643

[58] Field of Search ............... 426/250, 513, 643, 305, 426/412; 425/542; 249/119

[56] References Cited

U.S. PATENT DOCUMENTS

| | | | |
|---|---|---|---|
| 3,358,588 | 12/1967 | Rossnan | 426/513 |
| 3,863,017 | 1/1975 | Yueh | 426/513 |
| 4,158,065 | 6/1979 | Sugino | 426/643 |
| 4,285,980 | 8/1981 | Lewis | 426/513 |
| 4,303,008 | 12/1981 | Hice et al. | 426/513 |
| 4,362,752 | 12/1982 | Sugino | 426/643 |
| 4,396,634 | 8/1983 | Shenouda et al. | 426/643 |
| 4,497,844 | 2/1985 | Hice et al. | 426/643 |
| 4,557,940 | 12/1985 | Suzuki | 426/513 |
| 4,559,236 | 12/1985 | Okada | 426/643 |
| 4,584,204 | 4/1986 | Nishimura et al. | 426/643 |
| 4,588,601 | 5/1986 | Maruyama et al. | 426/513 |
| 4,622,234 | 11/1986 | Okada | 426/643 |
| 4,692,341 | 9/1987 | Ikeuchi et al. | 426/513 |
| 4,720,391 | 1/1988 | Kawana | 426/643 |
| 4,748,039 | 5/1988 | Ikeuchi et al. | 426/513 |

FOREIGN PATENT DOCUMENTS 38187 3/1981 Japan.

Primary Examiner—George Yeung
Attorney, Agent, or Firm—William W. Haefliger

[57] ABSTRACT

An imitation shrimp produce is produced by heating, in a mold cavity, a fish paste composition, the mold having at least two cavities, each cavity having the form of the shrimp product. The shrimp back portion of each cavity is accessed via an opening in the mold to allow formation of vein grooves in the curved back portion of the shrimp product; and such access is provided during injection of the composition into the mold.

25 Claims, 5 Drawing Sheets

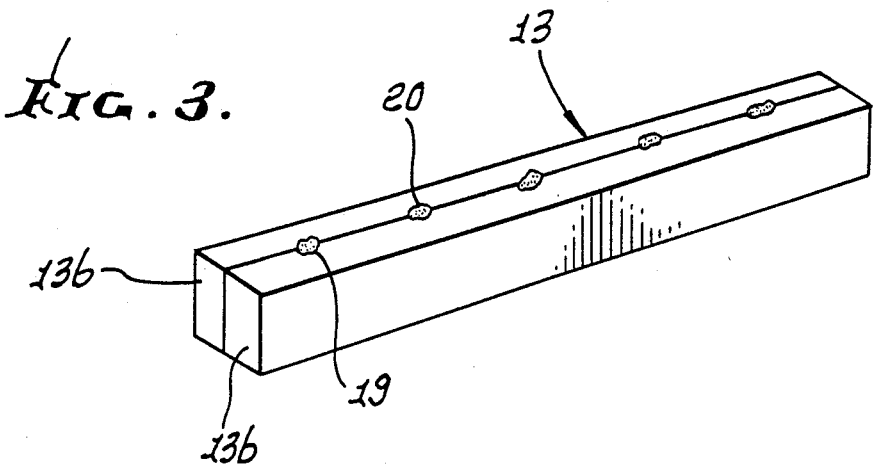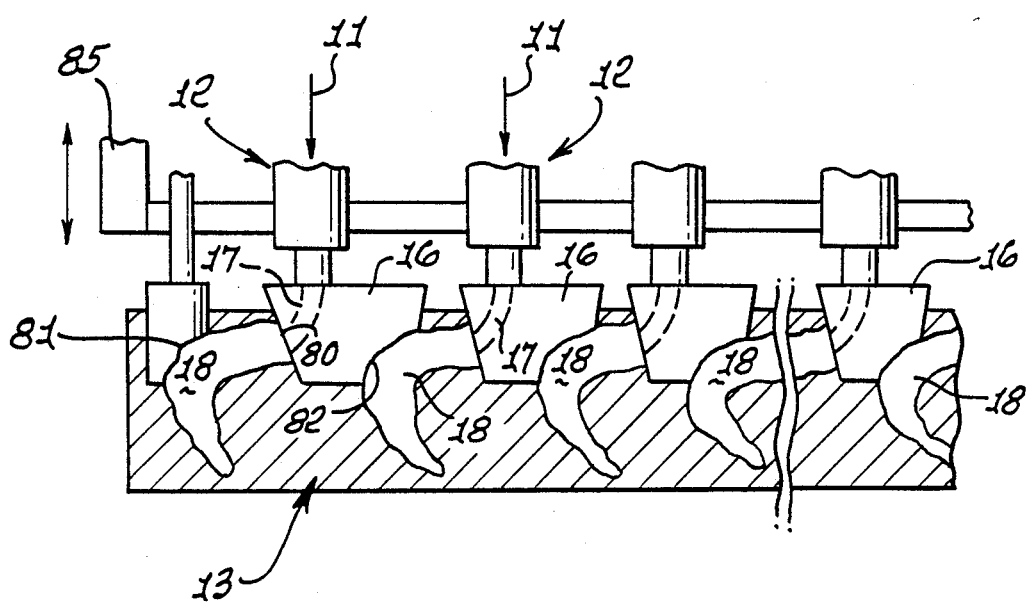

SHRIMP FORMING PROCESS

BACKGROUND OF THE INVENTION

This invention relates generally to a unique seafood product, one example being a crustacean product in the form of a shrimp, and to a process for making that product from comminuted fish meat.

The process of mechanically deboning fish meat has received increasing attention during the last twenty years throughout the world in order to utilize efficiently nutritious proteinaceous resources, such as numerous underutilized marine species. Many efforts have been made recently to produce less expensive, more attractive, more acceptable fabricated products for human consumption from mechanically deboned fish meat.

In U.S. Pat. No. 4,303,008, there is disclosed a process for producing a restructured food product from fish meat paste; however, that process is complex, and requires elevated pressurization of the paste in a mold during cooking.

There is need for a simple, reliable process to produce a fish paste crustacean product such as a superior shrimp product the shape of which closely simulates the shape of a natural shrimp; and there is need for such a process wherein, with very simple mold structure or tooling, a superior shrimp product, as disclosed herein, is produced, the back of the molded product being indented along the curvature thereof, to simulate a vein groove. Also, there is need for a process producing a shrimp product which is juicy and tender, the meat of which is not undesirably compressed, and which has the texture and shape of the crustacean.

SUMMARY OF THE INVENTION

It is a major object of the invention to provide an improved process, and product thereof, and which meets the above needs. Basically, the process includes the steps:

(a) providing a mold having at least two cavities therein, each cavity shaped in the form of said shrimp product, each cavity having a first opening adjacent to the shrimp end portion, and a second opening adjacent to the shrimp curved back portion, (b) injecting the shrimp paste mix into both cavities via said first opening while maintaining said second openings closed, (c) and subsequently accessing the curved back portion of the shrimp paste mix in the cavities, via said second openings, and forming simulated vein grooves in each curved back portion.

As will appear, injection nozzle bodies are provided to have porting via which shrimp paste composition is simultaneously injected into mold cavities, the bodies located to close the second openings to provide for molding of the curved and indented shrimp back portions; i.e., the nozzle bodies also act as shrimp back curvature molds, thereby greatly simplifying the process and mold tooling.

A series of molds may be provided, and the step of heating of the composition in the molds may advantageously be carried out by traveling a multi-cavity mold or molds in sequence past an exterior radiant heat source, such as flame-producing burners (with such nozzle bodies carried by each mold), and to a zone wherein the molds are sequentially opened and inverted while traveling, for gravitational discharge of the products. Such travel and mold-opening facilitates subsequent rotary brush-assisted removal of the products from the downward-facing and exposed cavities of the opened molds, and subsequent brush-cleaning of the re-closed molds at their surfaces adjacent to the vents, so that subsequent filling of the molds and vents can occur to produce the products.

In addition, further processing typically comprises broiling the formed product for between 50 and 70 seconds, and at a broiling zone wherein the temperature is between 160° C. and 200° C.; and subsequent cooking in a steam-containing zone, to impart juiciness to the bodies of the non-compressed crustacean-like products under time and temperature conditions as will appear. The use in the process of a mix of both fish paste and pieces of shredded, gelled fish paste ensures that the final product textures will closely simulate that of an actual shrimp.

These and other objects and advantages of the invention, as well as the details of an illustrative embodiment, will be more fully understood from the following specification and drawings, in which:

DRAWING DESCRIPTION

FIG. 3 is a perspective view of a closed mold, with fish paste in the mold cavities;

FIG. 4 is an elevation showing injectors and removable/movable mold parts positioned during fish-paste injection into mold cavities;

DETAILED DESCRIPTION

Figure 1:
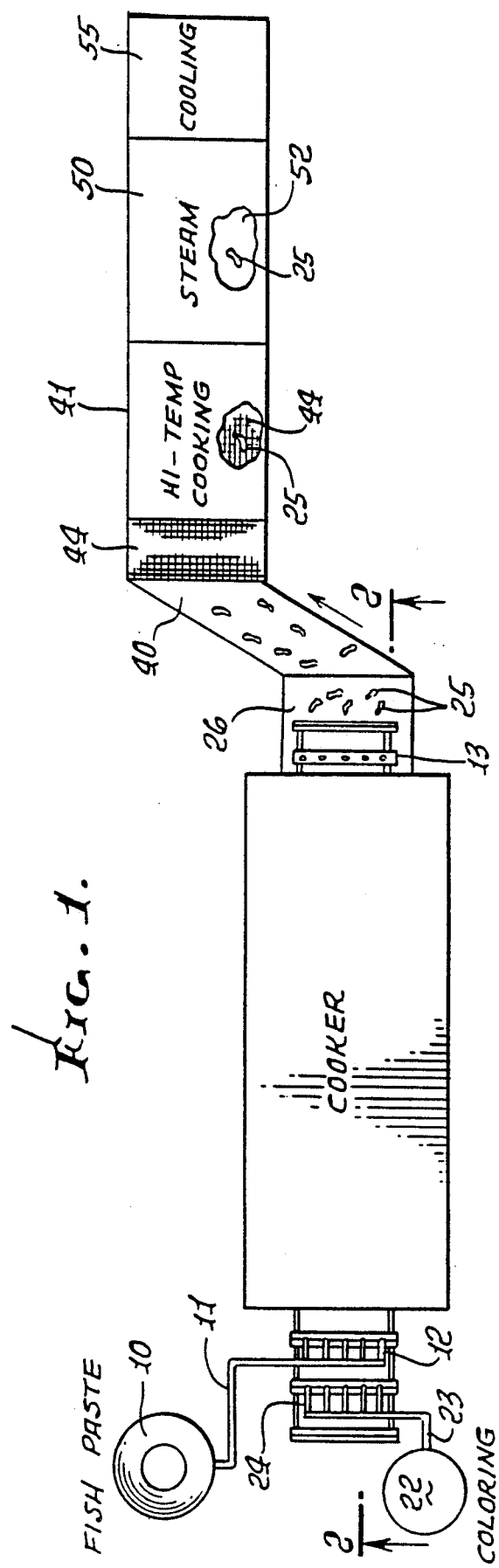
FIG. 1 is a plan view of apparatus used in carrying out the process.
Figure 2:
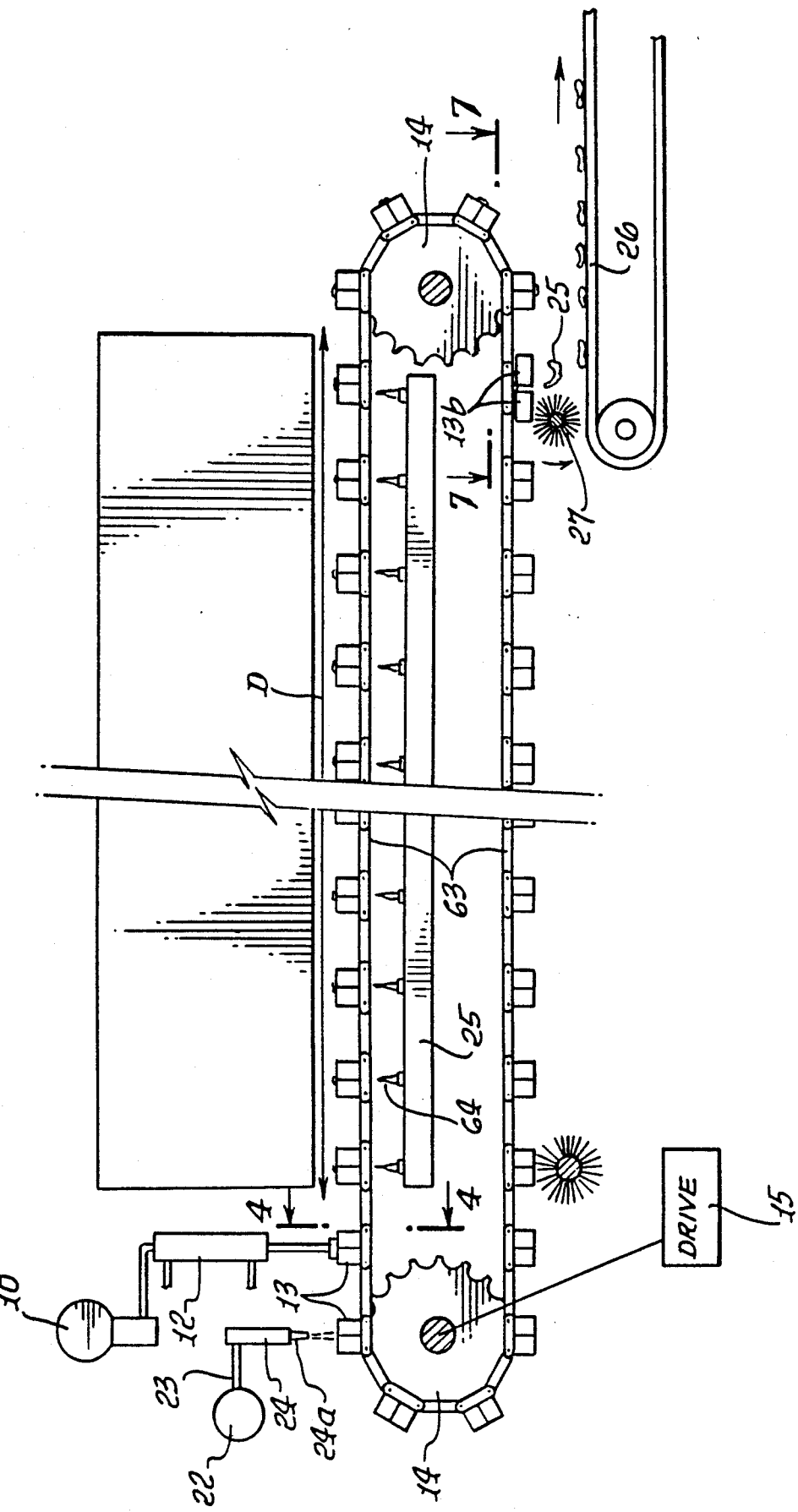
FIG. 2 is an enlarged side elevation on lines 2—2 of FIG. 1.

In FIGS. 1 and 2, comminuted fish is supplied at 10 to be treated in equipment to be described. Regarding such supply, and in one example of the process, for forming a crustacean-like product such as shrimp, frozen blocks of surimi (washed minced fish) are tempered at room temperature until partially thawed. Blocks of tempered surimi are then put into a grinder, and ground. Some hot water (at about 70° C.) is added to the surimi in the grinder to raise the temperature of the mix, for example, to about −1.0° C. Salt is then added to the formulation. After grinding for about 2 minutes, with temperature increased to about 3° C., more salt is added, and grinding is continued for 6 more minutes. Shrimp flavoring is added, and grinding is continued for another 6 minutes. The temperature of the finished paste is then around 8° C. The paste is then separated into two portions.

One such portion of the finished paste is spread onto rectangular pans, and allowed to set at about 8° C. for 20 hours, during which the paste physically transforms into an elastic gel.

After setting, the surimi gel is transferred to a steam cooker, and cooked at about 90° C. for about 80 minutes. The cooked gel is then shredded into small pieces, i.e., elongated pieces between 30 and 70 millimeters in length, 5 to 15 millimeters in width, and 0.5 to 1.0 millimeters in thickness. Three percent (by weight) of citric acid is added to the shredded gel, and the mix is allowed to soak for 15 minutes. The citric acid concentration is 10%. Acid is then pressed from the shredded gel, which is then combined with the second portion of flavored surimi paste, and the mix transferred to a shrimp-forming machine to be described. The ratio of shredded gel to flavored surimi paste is about 35:65.

Figure 5:
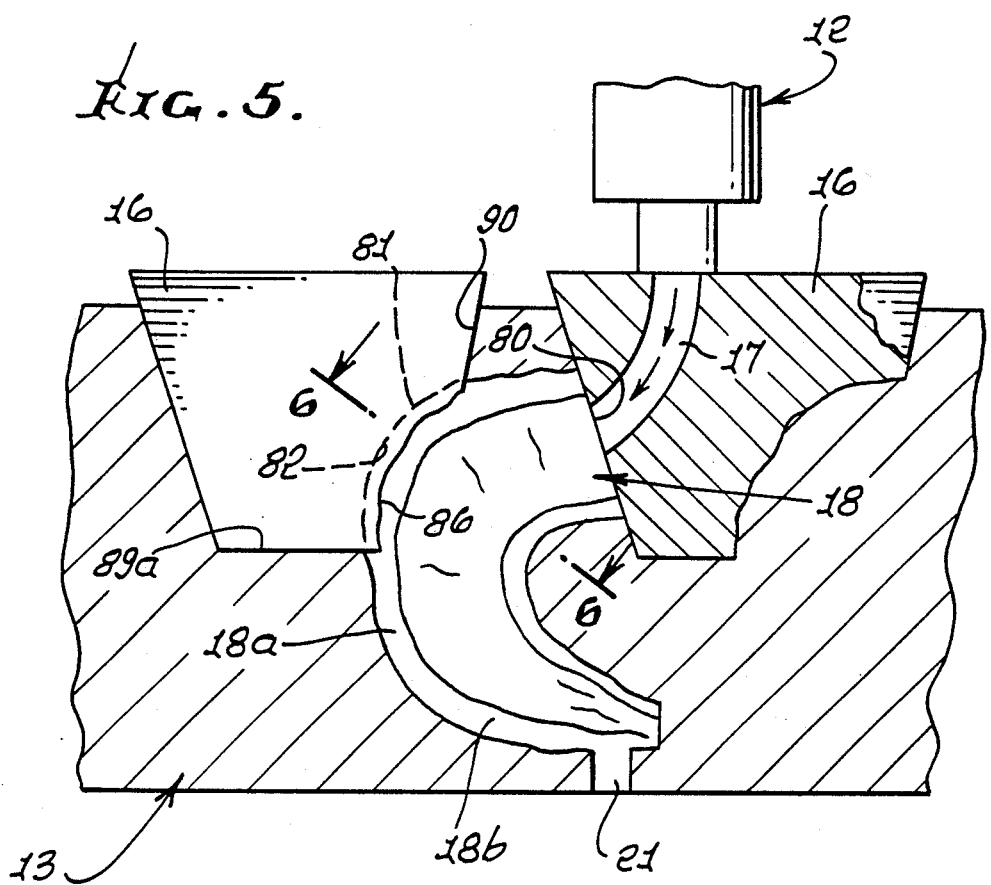
FIG. 5 is an enlarged section showing fish-paste injection through a nozzle in a removable mold part.
Figure 6:
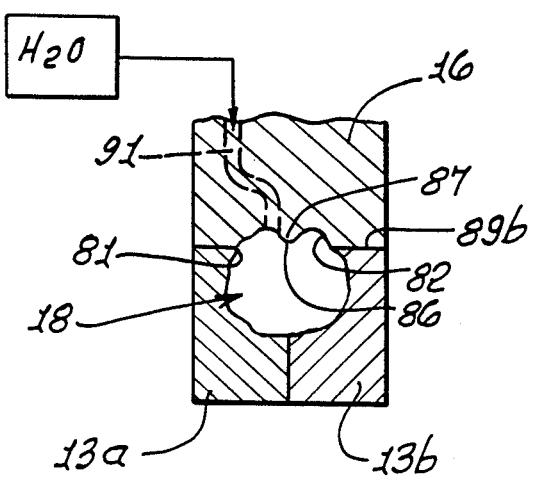
FIG. 6 is a section on lines 6—6 of FIG. 5.

The fish slurry (such as a mix of fish paste and pieces of shredded gelled fish paste), is supplied at 11 to injectors 12 for injecting the mix into heated molds 13. A series sequence of such molds is shown as provided on an endless-chain conveyor 63 entrained about sprockets 14. The conveyor is driven at 15 so that the travel of each mold is interrupted while the mold cavity or cavities are filled with the mix via the injector or injectors 12. See for example FIGS. 4 and 5 showing injector nozzle bodies 16 in down position and discharging mix at 17 into mold cavities 18. FIG. 3 shows a typical mold 13 to include the elongated and like mold sections 13b, which form multiple cavities 18 when the sections are closed together. FIGS. 5 and 6 show the shrimp-shaped configuration of the mold cavity. Note approximately C-shaped cavity region 18a corresponding to the shrimp body, and narrowed region 18b corresponding to the shrimp tail. A cavity air vent is formed at 21. The cavity 18 may alternatively have lobster, or other crustacean shape.

In FIGS. 4–6, each cavity has a first opening 80 adjacent to the shrimp larger end portion, and a second opening 81 adjacent to the shrimp curved-back portion. Paste is injected into each cavity via the first opening 80, while the second opening 81 is maintained closed.

Not only does the removable nozzle body 16 provide a port or passage 17 for paste to flow to and through opening 80, to fill cavity 18, but it also provides surface 82 that closes the second opening 81, referred to. This occurs in down position of the nozzle bodies, which are moved down and retracted upwards, in unison and relative to the molds, as by actuator means 85. FIGS. 5 and 6 show a curved projection 86 integral with the nozzle body projecting toward the cavity, so as to form a simulated vein groove 87 in the curved-back portion of the formed shrimp product, 86 being elongated.

Accordingly, the nozzle body 16 performs three functions:

provides a passage 17 for shrimp-paste flow to cavity 18, via opening 80, provides curved closure surface 82 to close the second opening 81, provides a curved projection 86 that forms the vein groove 87.

Note in FIGS. 5 and 6 that the nozzle body seats at 89a and 89b, on mold 13, in down position in the opening 90 formed in that mold. Water is desirably dripped, via port 91 in the nozzle, to lubricate the nozzle body surfaces 82 and 86 that contact the shrimp paste as it initially cooks (prior to withdrawal of the nozzle bodies and opening of the molds to release the product). This permits freeing of those surfaces 82 and 86, without sticking to the meat of the preliminarily cooked product.

Prior to injecting the mix into the mold cavities, a suitable colorant may be sprayed or otherwise transferred into the mold section cavities and onto the cavity surfaces. Such colorant may be water-soluble, and conveyed from a tank source 22, and via a line 23, to injectors 24. The injectors may be lowered so that their nozzle ends 24a penetrate the mold vents 19, to spray colorant in water into the cavities. A suitable cavity lubricant, or release composition, may also be conveyed in the spray, to coat cavity surfaces.

As the filled and heated molds are transported to the right, in FIG. 2, they are further heated exteriorly as by gas flames 64 rising from gas burner 25, or other heat source means. Combustible fuel heating is preferred due to simplicity of equipment, and temperature control. Such heating is typically continued while the mold travels distance D over the flames, and for between 60 and 100 seconds, and optimally for about 72 seconds, and at a temperature or temperatures to cook the mix, causing it to cohere and form a unitary, soft product, discharged at 25 onto a second conveyor 26. The product temperature upon such discharge is between 60° and 75° C., and preferably at least about 65° C.

Note that the vents 19 are directed upwardly, away from and out of the path of the flames 24, so that the exposed mix outwardly of the vents 19 is not directly contacted by the flames. Further, such cooking causes expansion of the mix in the cavity, and its outward expansion or displacement (see broken lines 20b in FIG. 5) from and relative to vent 19, the portion thus protruding being randomly uneven in surface texture, to simulate the neck region of an actual shrimp after pull-off of the shrimp head. This is made possible due to the process described and to be described, and further characterized by an absence of pressurization of the mix in the continuously vented mold cavity, during cooking in the mold.

FIGS. 2 and 7–9 also illustrate mold opening, to downwardly expose the mold section cavities, for product fall-out, by gravity, onto conveyor 26. See for example the opened sections 13b in FIG. 2. A rotary brush 27 may be employed to brush against the underside of the molds to clean the cavities of any remnant cooked mix, and/or to assist in product discharge from the mold sections.

Figure 7:
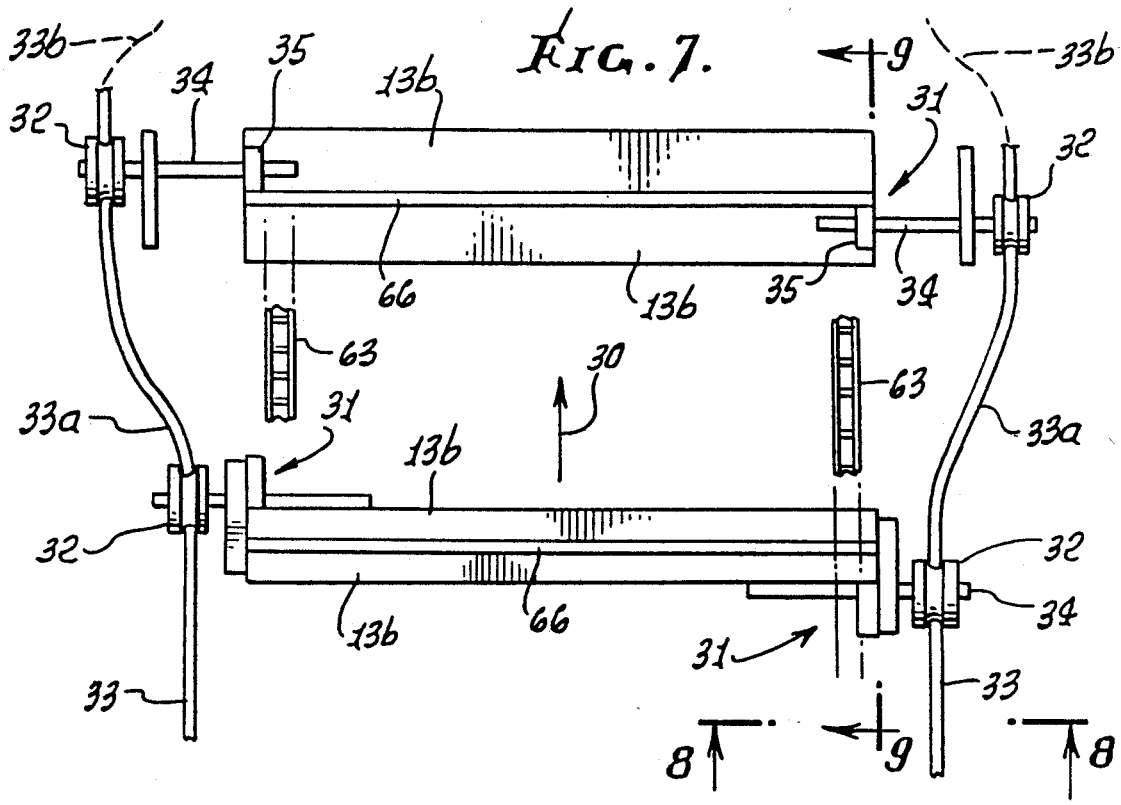
FIG. 7 is an enlarged plan view taken on lines 7—7 of FIG. 2.
Figure 8:
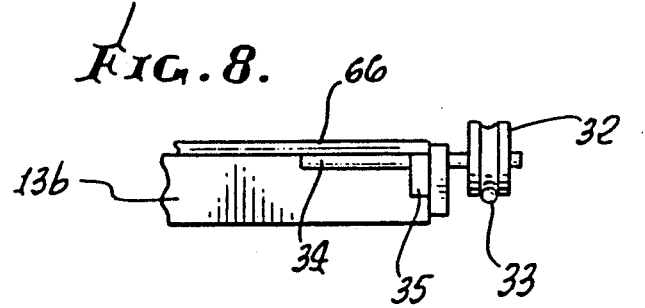
FIG. 8 is a fragmentary section on lines 8—8 of FIG. 7.
Figure 9:
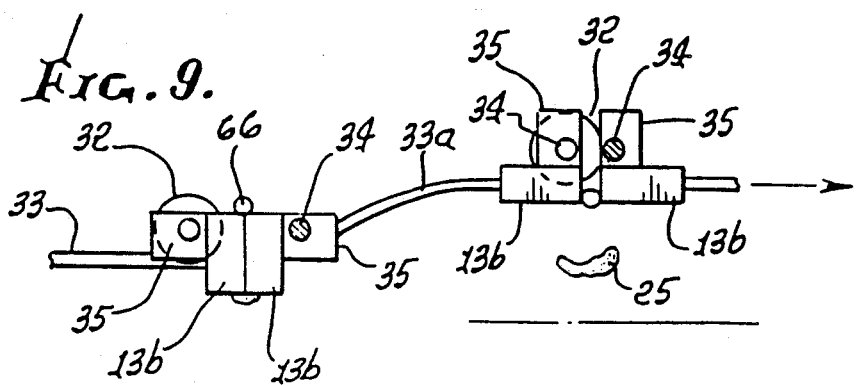
FIG. 9 is a fragmentary section on lines 9—9 of FIG. 7.

FIG. 7 shows the molds conveyed in direction 30, with slidable camming units 31 attached to the section 13b. The units 31 are activated in response to sideward displacement of rollers 32 traveling along rails 33, which diverge laterally at 33a. As rollers 32 are displaced laterally by the rails, cam unit sides 34 interact with followers 35 to pivot each mold section about 90°, one forwardly and the other rearwardly, to open the mold. Thereafter, the molds are closed as the rollers 32 travel along the rails that converge at regions 33b. See also mold section hinges 66.

Referring back to FIG. 1, product 25 on conveyor 26 is transferred to and by another conveyor 40, to further processing equipment. Such further processing typically includes broiling the product at 41, for a time interval $t_1$ between 50 and 70 seconds, and at a broiling zone wherein the temperature is between 160° C. and 200° C. For best results, the product is broiled for about 64 seconds, and at a temperature or temperatures of about 180° C., the product temperature at the end of broiling being about 60° C. Such broiling is desirably carried out while the product is supported on a slowly traveling openwork metal grid that includes conveyor 44 in the broiling zone, and by combusting gas at upper and lower sides of the grid to directly transmit broiling heat to opposite sides of the product.

Subsequently, the product is cooked in an enclosed, steam-filled zone 50 for a time interval $t_2$, between 9 and 11 minutes. Zone 50 is typically at atmospheric pressure, and the temperature therein is kept between 80° C. and 110° C., and preferably at about 85° C. for best results. The product may be traveled on a conveyor 52 in zone 50.

Finally, at the end of $t_2$, the product is transferred into a cooling zone 55, kept at a temperature of around 0° C. The cooled product is then packed for shipment.

In the above, the mold may be metallic, with coating surfaces formed by TEFLON to prevent product adherence. Due to the non-smooth configuration of the cavity surfaces having shrimp-body shape, the sprayed-in reddish color will not coat the surfaces uniformly, so that the resultant color transferred to the product will impart a true shrimp surface look to the product.

The red color can be any standard FDA-approved red color.

Upward removal of the nozzle bodies loosely severs the simulated shrimp product at the head ends thereof, i.e., adjacent to openings 80, to give a natural look to that head end of the product. The paste remaining in nozzle body ports 17 may be so injected into mold cavities 18 of a subsequent mold advanced by conveyor to the injection positions.

What is claimed is:

1. The process of forming an imitation crustacean product in the of a shrimp having a curved back portion and an end portion toward which said curved back portion extends, and using a shrimp paste mix, said process including the steps
  (a) providing a mold having at least two cavities therein, each cavity shaped in the form of said shrimp product, each cavity having a first opening adjacent to the shrimp end portion, and a second opening adjacent to the shrimp curved back portion,
  (b) injecting the shrimp paste mix into both cavities via said first openings while maintaining said second openings closed,
  (c) and gaining access to the curved back portion of the shrimp paste mix in the cavities, via said second openings, and forming simulated vein grooves in each curved back portion, in response to said injecting of the shrimp paste into both cavities.
  (d) the process including providing nozzle bodies which have portings, and displacing said nozzle bodies into position in the mold and carrying out said paste mix injecting through said portings, and simultaneously utilizing said nozzle bodies to effect said closing of the second openings and said forming of the simulated vein grooves.

2. The process of claim 1 including heating the mold to at least partially cook the mix in the cavities, and to set the mix, while said nozzle bodies remain in said positions in the mold.

3. The process of claim 2 including opening the mold, including removing said nozzle bodies from the mold, and recovering the formed products from said cavities.

4. The process of claim 1 wherein said first opening is adjacent to the largest end of the shrimp product, and wherein each nozzle body is displaced into a position between the two openings, of successive cavities.

5. The process of claim 2 wherein said heating of the mold is carried out while traveling the mold past exterior heat source means.

6. The process of claim 5 wherein the mold is heated by said exterior heat source means and during said travel to at least about 65° C.

7. The process of claim 6 wherein exterior heating is continued for between 60 and 100 seconds, after which the mold is inverted and opened to allow removal of the nozzle bodies and to allow the formed product to drop from the cavity.

8. The process of claim 7 wherein said heating is continued for about 72 seconds.

9. The process of claim 6 wherein a series of said molds is sequentially traveled in a loop, by conveyor means, said heating of the molds carried out to upwardly heat-closed molds from therebeneath as they travel.

10. The process of claim 9 wherein said heating is effected by combusting gas beneath the closed molds as they travel generally horizontally, and also traveling opened molds beneath said combusting gas.

11. The process of claim 1 including initially injecting coloring into each mold cavity, just prior to said mix-injecting step.

12. The process of claim 10 including brushing cavity sides of the opened molds to assist in removal of the formed products from said cavities.

13. The process of claim 10 including brushing mold exterior surfaces adjacent to said openings prior to said mix-injecting step, to free said surfaces of cooked fish paste.

14. The process of claim 7 including broiling the formed product for between 50 and 70 seconds at a broiling zone wherein the temperature is between 160° C. and 200° C.

15. The process of claim 14 wherein said broiling is carried out for about 64 seconds at temperature in said broiling zone, which is about 180° C.

16. The process of one of claims 14 and 15 wherein the temperature of the formed product at the end of said broiling is about 60° C.

17. The process of claim 14 wherein said broiling is carried out by supporting said fish product on an open-work grid in said zone, and by combusting gas at opposite sides of said grid to transmit broiling heat to opposite sides of the formed product.

18. The process of claim 6 wherein heating includes
  (i) broiling said formed product for a first time interval $t_1$, and
  (ii) subsequently cooking said broiled product in the presence of steam, and for a second time interval $t_2$, where $t_2$ is at least three times larger than $t_1$.

19. The process of claim 18 wherein $t_1$ is between 50 and 70 seconds, and $t_2$ is between 9 and 11 minutes.

20. The process of claim 19 wherein said broiling is carried out in a broiling zone wherein the temperature is between 160° C. and 200° C., and said cooking is carried out in a steam-filled zone wherein the temperature is between 80° C. and 110° C.

21. The process of claim 20 wherein the product is removed from said zone at the end of $t_2$, and at a product temperature of about 85° C.

22. The process of claim 18 including cooling said product at the end of $t_2$, and to a temperature of about 0° C., for packing.

23. The process of claim 1 including contacting the shrimp paste mix in the cavities with aqueous liquid.

24. The process of claim 23 wherein said liquid consists of water.

25. The process of claim 23 wherein said contacting is carried out to contact said curved back portion of the mix in the cavity with said liquid.

* * * * *